US010698520B2

(12) United States Patent
Yu

(10) Patent No.: US 10,698,520 B2
(45) Date of Patent: Jun. 30, 2020

(54) FORCE TOUCH-BASED COMMUNICATION ENHANCEMENT METHOD AND TERMINAL

(71) Applicant: HUAWEI TECHNOLOGIES CO., LTD., Shenzhen, Guangdong (CN)

(72) Inventor: Rongdao Yu, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/287,726

(22) Filed: Feb. 27, 2019

(65) Prior Publication Data

US 2019/0196640 A1 Jun. 27, 2019

Related U.S. Application Data

(63) Continuation of application No. PCT/CN2016/097584, filed on Aug. 31, 2016.

(51) Int. Cl.
*H04W 52/04* (2009.01)
*G06F 3/041* (2006.01)
*H04W 52/14* (2009.01)
*H04W 52/28* (2009.01)
*H04B 17/10* (2015.01)

(52) U.S. Cl.
CPC ............ *G06F 3/0414* (2013.01); *G06F 3/041* (2013.01); *H04B 17/101* (2015.01); *H04W 52/146* (2013.01); *H04W 52/288* (2013.01)

(58) Field of Classification Search
CPC ........... H04W 52/0254; H04W 52/027; H04W 52/04; H04W 52/18; H04W 52/38; H04W 52/54; H04W 52/146; H04W 52/288; H04M 2250/22; H04B 17/101
See application file for complete search history.

(56) References Cited

U.S. PATENT DOCUMENTS

| 9,084,230 | B2* | 7/2015 | Park | H04W 52/0209 |
| 9,301,336 | B2* | 3/2016 | Park | H04W 52/0209 |
| 10,419,991 | B2* | 9/2019 | Wang | H04W 28/06 |

(Continued)

FOREIGN PATENT DOCUMENTS

| CN | 1717888 A | 1/2006 |
| CN | 101765825 A | 6/2010 |

(Continued)

*Primary Examiner* — Jean A Gelin
(74) *Attorney, Agent, or Firm* — Womble Bond Dickinson (US) LLP

(57) ABSTRACT

Embodiments of the present invention provide a communication enhancement method for a mobile terminal, and a mobile terminal. A force touch technology and a communications technology are combined, to enhance user communication by means of force touch; and a quantity of transmit and receive antennas, a transmit power, a transmission bandwidth, a transmission rate, a quantity of connections, and the like for mobile communication are adjusted, thereby providing users with better communication experience. The method provided in the present invention includes: obtaining, by a mobile terminal, a sensing signal generated from a press of a user; detecting, by the mobile terminal, a strength value of the sensing signal; and determining, by the mobile terminal, an uplink communication transmission capability according to the strength value of the sensing signal.

18 Claims, 6 Drawing Sheets

(56) References Cited

U.S. PATENT DOCUMENTS

| | | | |
|---|---|---|---|
| 2005/0157687 A1* | 7/2005 | Heo | H04L 1/0041 |
| | | | 370/335 |
| 2008/0267098 A1 | 10/2008 | Walton et al. | |
| 2009/0027353 A1 | 1/2009 | Im et al. | |
| 2009/0262720 A1* | 10/2009 | Kwon | H04W 72/1289 |
| | | | 370/342 |
| 2011/0069024 A1* | 3/2011 | Kim | G06F 3/01 |
| | | | 345/173 |
| 2012/0105358 A1 | 5/2012 | Momeyer et al. | |
| 2012/0113061 A1 | 5/2012 | Ikeda | |
| 2012/0142393 A1* | 6/2012 | Won | H04W 52/246 |
| | | | 455/522 |
| 2012/0146863 A1* | 6/2012 | Kwon | H01Q 1/243 |
| | | | 343/720 |
| 2013/0127765 A1 | 5/2013 | Behdasht et al. | |
| 2013/0310020 A1 | 11/2013 | Kazuhiro | |
| 2014/0010161 A1* | 1/2014 | Jeong | H04L 47/14 |
| | | | 370/328 |
| 2014/0369320 A1* | 12/2014 | Gurcan | H04B 7/0443 |
| | | | 370/335 |
| 2015/0236780 A1* | 8/2015 | Jalali | H04W 84/06 |
| | | | 455/13.4 |
| 2015/0334703 A1* | 11/2015 | Xu | H04W 72/0446 |
| | | | 370/253 |
| 2015/0338993 A1* | 11/2015 | Kuo | G06F 3/041 |
| | | | 345/178 |
| 2016/0239134 A1* | 8/2016 | Tseng | G06F 1/1626 |
| 2016/0254832 A1* | 9/2016 | Yoo | H04B 1/3838 |
| | | | 455/575.5 |
| 2017/0093023 A1* | 3/2017 | Cai | H01Q 1/22 |
| 2017/0245158 A1 | 8/2017 | Xiao et al. | |
| 2017/0269753 A1* | 9/2017 | Zhang | G06F 3/0416 |
| 2017/0371475 A1* | 12/2017 | Cheng | G06F 3/0416 |

FOREIGN PATENT DOCUMENTS

| | | |
|---|---|---|
| CN | 102325365 A | 1/2012 |
| CN | 102473073 A | 5/2012 |
| CN | 103201714 A | 7/2013 |
| CN | 104137037 A | 11/2014 |
| CN | 104991673 A | 10/2015 |
| CN | 105429668 A | 3/2016 |
| CN | 105900478 A | 8/2016 |
| EP | 3217714 A1 | 9/2017 |
| JP | 2011018988 A | 1/2011 |
| JP | 2013541795 A | 11/2013 |
| JP | 2016040914 A | 3/2016 |
| WO | 2013112387 A1 | 8/2013 |
| WO | 2016024805 A1 | 2/2016 |
| WO | 2016/070423 A1 | 5/2016 |

* cited by examiner

FORCE TOUCH-BASED COMMUNICATION ENHANCEMENT METHOD AND TERMINAL

CROSS-REFERENCE TO RELATED APPLICATIONS

This application is a continuation of International Application No. PCT/CN2016/097584, filed on Aug. 31, 2016, which is hereby incorporated by reference in its entirety.

TECHNICAL FIELD

Embodiments of the present invention related to a method for controlling a communication capability on a wireless communications network, and in particular, to force touch-based communication enhancement method and a terminal.

BACKGROUND

In existing smartphones, a force touch technology is introduced. This technology extends a conventional two-dimensional operation on a touchscreen to a three-dimensional operation, to implement different operations by identifying forces that are perpendicular to a direction of the screen and that are of different magnitudes. In addition to well-known multi-touch gestures such as tapping, swiping, and pinching using two fingers, force touch further provides other user experience. For example, force touch can help a user browse emails in an inbox more quickly and more efficiently. To have a preview, the user only needs to lightly press an email, and then content of the email pops up over the inbox. If the displayed content is incomplete, the user can open the email by pressing a little more heavily, to view the complete content. This is like tapping in the inbox to open the email. For another example, during photo shooting, if the user wants to view a photo that is already taken, the user only needs to lightly press a thumbnail, to have a preview, and can continue to take a photo after releasing the finger. If the user wants to open a photo, the user only needs to press the photo slightly heavily, and then the photo is opened.

In the prior art, a magnitude of pressing force of a user is mainly used as a basis to implement a related system preset operation or replace some shortcuts to complete corresponding functions. This is mostly used in aspects concerning user interfaces. However, a main function of a smart terminal is communication, but in the prior art, the force touch technology is not combined with communication to provide users with a better communications service or better communication experience.

SUMMARY

Embodiments of the present invention provide a force touch-based communication enhancement method and a mobile terminal. User communication is enhanced by means of force touch, thereby providing users with better communication experience.

According to a first aspect, an embodiment of the present invention provides a force touch-based communication enhancement method.

A mobile terminal obtains a sensing signal generated from a press of a user. For example, a touchscreen of the mobile terminal is pressed to generate a force sensing signal. The mobile terminal detects a strength value of the sensing signal, and the mobile terminal may determine a communication transmission capability according to the strength value of the sensing signal. In this way, when the user needs to improve a communication capability, the communication capability of the mobile terminal is adjusted by simply pressing a related position (for example, a touchscreen). In one embodiment of the present invention, a force touch technology is combined with communication, so that the mobile terminal can adaptively adjust the communication capability by monitoring sensing signals.

In one embodiment, the mobile terminal maps a magnitude of force to a quantity of antennas to be enabled, enables the corresponding quantity of antennas, and performs uplink data transmission by using the enabled antennas. In this case, the mobile terminal determines, according to the strength value of the sensing signal, the quantity of antennas to be enabled.

In one embodiment, the mobile terminal maps a magnitude of force to a transmit power increment and sends uplink data according to the power increment. In this case, the mobile terminal determines, according to the strength value of the sensing signal, the transmit power increment. In one embodiment, the mobile terminal calculates a sum of the transmit power increment and a current transmit power; and if the sum of the transmit power increment and the current transmit power is less than a maximum transmit power, the mobile terminal sends data at the sum of the transmit power increment and the current transmit power; otherwise, transmits data at the maximum transmit power.

In one embodiment, the mobile terminal determines an uplink data rate according to the strength value of the sensing signal. The mobile terminal maps a magnitude of force to the uplink data rate and sends uplink data according to the uplink data rate.

In one embodiment, the mobile terminal maps a magnitude of force to an uplink data rate increment and sends uplink data according to the uplink data rate increment. In one embodiment, the mobile terminal sends the data according to a sum of the uplink data rate increment and a current uplink data rate.

In one embodiment, the mobile terminal determines an uplink transmission bandwidth according to the strength value of the sensing signal. The mobile terminal maps a magnitude of force to the uplink transmission bandwidth and sends uplink data according to the uplink transmission bandwidth. In one embodiment, the mobile terminal maps the magnitude of force to an uplink transmission bandwidth increment and sends the uplink data according to the uplink transmission bandwidth increment. The mobile terminal sends the data according to a sum of the uplink transmission bandwidth increment and a current uplink transmission bandwidth.

In one embodiment, the mobile terminal maps a magnitude of force to a quantity of uplink connections and sends uplink data according to the quantity of uplink connections. In one embodiment, an uplink connection may include a cellular connection, a WiFi connection, a high-frequency connection, or a low-frequency connection, or may be a combination of multiple types of connections.

In the foregoing embodiments, the mobile terminal receives the press of the user in a signal strength display area.

According to a second aspect, an embodiment of the present invention provides a force touch-based communication enhancement method. A mobile terminal obtains a sensing signal generated from a press of a user. The mobile terminal detects a strength value of the sensing signal, and the mobile terminal feeds back the strength value of the sensing signal or a communication enhancement requirement level to a base station. The base station receives a magnitude of force, a force rating, or the communication enhancement requirement level fed back by the mobile terminal, and performs scheduling according to the received magnitude of force, force rating, or communication enhancement requirement level, to enhance downlink communication transmission.

In one embodiment, when the base station performs scheduling according to the received magnitude of force, force rating, or communication enhancement requirement level, the base station adjusts a quantity of downlink transmit antennas according to the magnitude of force, force rating, or communication enhancement requirement level; or adjusts a downlink transmit power according to the magnitude of force, force rating, or communication enhancement requirement level; or adjusts a downlink data sending rate according to the magnitude of force, force rating, or communication enhancement requirement level; or adjusts a downlink transmission bandwidth according to the magnitude of force, force rating, or communication enhancement requirement level; or adjusts a quantity of downlink connections according to the magnitude of force, force rating, or communication enhancement requirement level; or the like.

According to a third aspect, an embodiment of the present invention further provides a force touch-based communication enhancement method. A mobile terminal obtains a sensing signal generated from a press of a user, detects a strength value of the sensing signal, and then requests information related to a force touch-based communication enhancement capability of the mobile terminal. The mobile terminal receives the information that is related to the force touch-based communication enhancement capability of the mobile terminal and that is fed back by a network side. The mobile terminal performs communication-enhanced transmission according to the information related to the force touch-based communication enhancement capability.

In one embodiment, the information related to the force touch-based communication enhancement capability further includes: information about whether the mobile terminal has the force touch-based communication enhancement capability, or a level of the force touch-based communication enhancement capability of the mobile terminal.

According to a fourth aspect, an embodiment of the present invention provides a mobile terminal and a base station (or another network-side device) that implement the foregoing methods. The mobile terminal and the base station are configured to implement a device or an apparatus in the foregoing method embodiments. Components or entity functional hardware of the mobile terminal and the base station can implement all steps in the foregoing method embodiments, and can execute links in the foregoing method embodiments.

In the embodiments of the present invention, a pressing signal detected by a sensor is combined with a communications technology. The pressing signal detected by the sensor is used to enhance user communication, improve a transmission rate of user data, enhance a signal receiving capability of a terminal, and the like, thereby providing users with better experience.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In a conventional communications system, such as a third generation 3G (3rd Generation) WCDMA (Wideband Code Division Multiple Access) communications system or a fourth generation 4G (4th Generation) LTE (Long Term Evolution) communications system, a base station serves as a main control device, controls communication of a terminal, is responsible for resource scheduling for the terminal, and determines a transmission mode, a transmission rate, a transmit power, and the like of the terminal. As smartphones are developed, processing capabilities of smartphones are increasingly strong. It is predicted that in the future 5G (5th Generation) communications system era, a configuration of a 16-core CPU and 8 Gigabyte RAM will be widely applied to smartphones, and the processing capabilities of the smartphones will become increasingly strong. Therefore, the smartphones can be used to assist a base station in performing scheduling and control. For example, a terminal may partially assist a base station in determining a transmission mode, a transmission rate, a transmit power, and a quantity of transceiver antennas, and the like of the terminal. On the other hand, recently, some smartphones are equipped with a force touch (force touch)-based force touchscreen technology, where multiple tiny electrodes are arranged around a display screen. According to this technology, the screen not only can identify each touch operation, but also can implement force sensing, to sense whether a user performs a "light tapping" or "pressing" operation, thereby implementing different operations in different interfaces or enabling a corresponding application program. In one embodiment of the present invention, the force touch technology is combined with a communications technology. Force touch is used to enhance user communication, improve a transmission rate of user data, and enhance a signal receiving capability of a terminal, thereby providing users with better experience.

Figure 1:
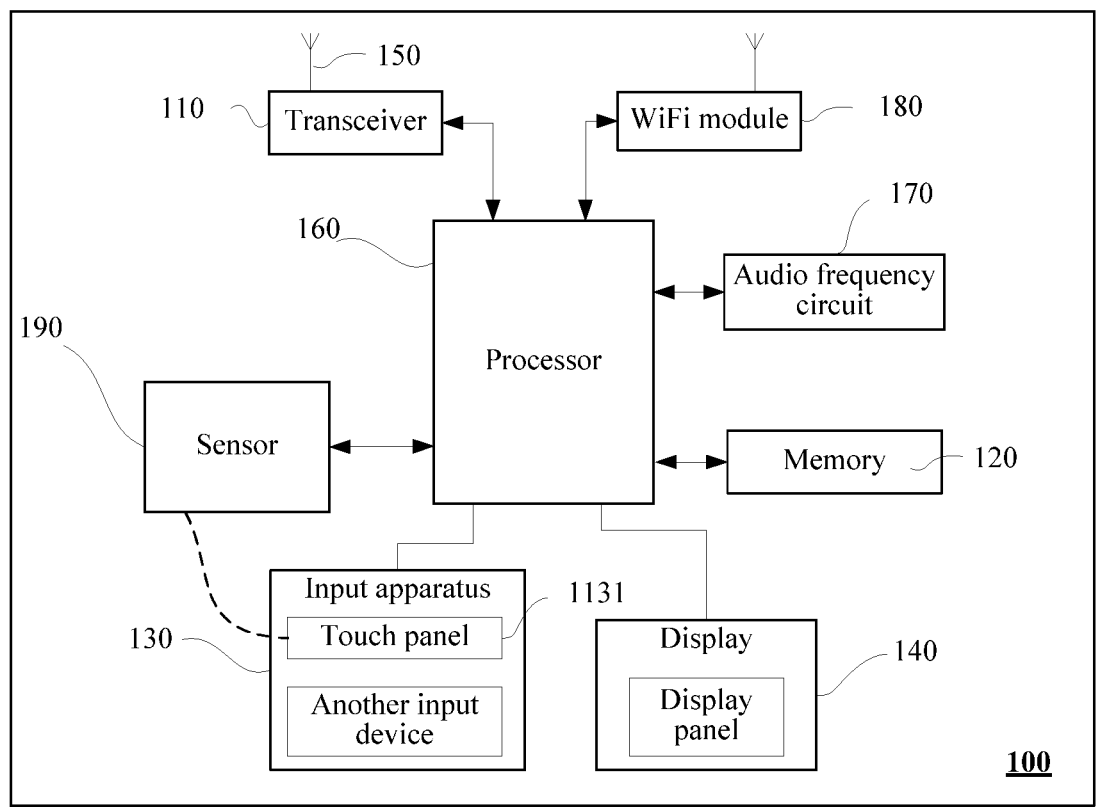
FIG. 1 is a schematic structural diagram of a mobile terminal according to an embodiment of the present invention.

FIG. 1 is a schematic structural diagram of a mobile terminal 100 according to an embodiment of the present invention. As shown in FIG. 1, the mobile terminal 100 may be a smartphone, a tablet computer, a PDA (personal digital assistant), a POS (point of sales), a vehicle-mounted computer, or the like. Referring to FIG. 1, the terminal 100 according to one embodiment of the present invention includes a transceiver 110, a memory 120, an input apparatus 130, a display 140, an antenna 150, a processor 160, an audio frequency circuit 170, a WiFi module 180, a sensor 190, and the like. For example, conventional parts such as a power source, a microphone, and a loudspeaker are not shown in the figure. The input apparatus 131 includes a touch panel 1131 and another input device. The display 140 includes a display panel.

The transceiver 110 includes a radio frequency circuit, an amplifier, a coupler, a duplexer, and the like. The antenna 150 is configured to receive and send information. The mobile terminal 100 may include multiple antennas 150. When there are multiple antennas 150, whether one or more antennas 150 thereof are enabled or disabled is controlled by the processor 160. The transceiver sends, by using the antenna, uplink data to a base station or a network device by using the antenna 150. The transceiver 110 may also access, by using the antenna 150 or another module (such as the WiFi module 180), a network or another device, for example, a cellular network, a WiFi network, a high-frequency connection device, or a low-frequency connection device, by using multiple wireless communications standards. A quantity of connections of the mobile terminal 110 is controlled by the processor 160, and the mobile terminal 110 may simultaneously access multiple networks. In this embodiment of the present invention, a quantity of antennas 150 to be enabled or a quantity of networks to be connected may be determined after the processor 160 analyzes a strength value of a sensing signal obtained by the sensor 190. A transmit power of the antenna or a power of the transceiver may also be determined after the processor 160 analyzes the strength value of the sensing signal obtained by the sensor. The sensor 190 may sense a signal, such as a force signal, by using the touch panel 1131 in the input apparatus. The processor 160 may further generate a communication strength requirement signal according to the sensing signal obtained by the sensor 190, and send the communication strength requirement signal to the base station or the network device by using the transceiver 110, so that more wireless resources are available for scheduling performed by the base station or the network device. Alternatively, the processor 160 may directly send the obtained sensing signal to the base station or the network device by using the transceiver 110, so that more wireless resources are available for scheduling performed by the base station or the network device.

The input apparatus 130 may include the touch panel 1131. The touch panel 1131, also referred to as a touchscreen, may collect a touch operation of a user on or near the touch panel 1131 (for example, an operation of the user on the touch panel 1131 or near the touch panel 1131 by using any proper object or accessory such as a finger or a stylus). The touch panel 1131 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, and then sends the contact coordinates to the processor 160; and can receive and execute a command sent by the processor 160. The touch panel 1131 may also be associated with the sensor. The sensor 190 obtains a force sensing signal by detecting the touch panel, and the sensor sends the force sensing signal to the processor. In some implementations, the touch panel 1131 and the sensor 190 may be integrated as a whole. Certainly, the sensor 190 may also be completely independent from the touch panel 1131, and sense an external operation on each position of the mobile terminal. In addition to the touch panel 1131, the input unit 130 may further include another input device 132. The another input device 132 may include but is not limited to one or more of a physical keyboard, a function key (such as a volume control key or an on/off key), a trackball, a mouse, or a joystick. The terminal 100 may further include a display 140. The display 140 may be configured to display information input by a user, or information to be provided to the user and various menu interfaces of the terminal 100. The display 140 may include a display panel. Optionally, the display panel may be configured in a form of an LCD (Liquid Crystal Display), an OLED (Organic Light-Emitting Diode), or the like. In one embodiment, the input apparatus 130 and the display 140 may be integrated as a whole, or seemingly integrated as a whole. This is easy to be implemented. For example, the touch panel may cover the display panel. Although the touch panel and the display panel are illustrated as two independent parts in the figure, in some embodiments, the two may be integrated. The memory 120 is configured to store a software program and a corresponding module. The processor 160 runs the software program stored on the memory 120 to execute various functional applications and data processing on the mobile terminal. The audio frequency circuit 170 may provide an audio interface between a user and the mobile terminal, audio processing required by the mobile terminal, and the like. The processor 160 is a control center of the mobile terminal, and connects parts of the mobile terminal by using various interfaces and lines, to manage and monitor the mobile terminal. The processor has a powerful processing capability. Therefore, it is considered that various types of processing may be completed by the processor, and then, a feedback is provided, or a related component is instructed to perform an action.

This embodiment of the present invention is applied to a wireless communications network, such as a 3G, 4G, and 5G wireless communications network. A mobile terminal accesses the communications network in a wireless manner. Generally, data transmission from a mobile terminal to a base station is referred to as uplink transmission, and data transmission from a base station to a mobile terminal is referred to as downlink transmission. A sensor 190 is configured to obtain a sensing signal generated from a press of a user. A processor is configured to detect a strength value of the sensing signal. When a magnitude of force exceeds a specific threshold, a communication enhancement processing module performs processing to implement communication capability enhancement, for example, adjusts a quantity of transmit antennas for uplink transmission, adjusts a transmit signal power in uplink transmission, adjusts an uplink transmission data rate, adjusts an uplink transmission bandwidth, or adjusts a quantity of connections for uplink transmission. A transceiver is configured to transmit uplink data to a base station or a network device by using an antenna. A receiving module is configured to receive downlink data from the base station or the network device. The base station or the network device includes a transmitter, a receiver, and a processor. The transmitter is configured to transmit data to the mobile terminal. The receiver is configured to receive data from the mobile terminal. The processor is configured to implement communication enhancement, for example, feed back a control signal or send scheduling information, to adjust a quantity of transmit antennas for downlink transmission, adjust a transmit signal power in downlink transmission, adjust a downlink transmission data rate, adjust a downlink transmission bandwidth, or adjust a quantity of connections for downlink transmission.

Figure 2:
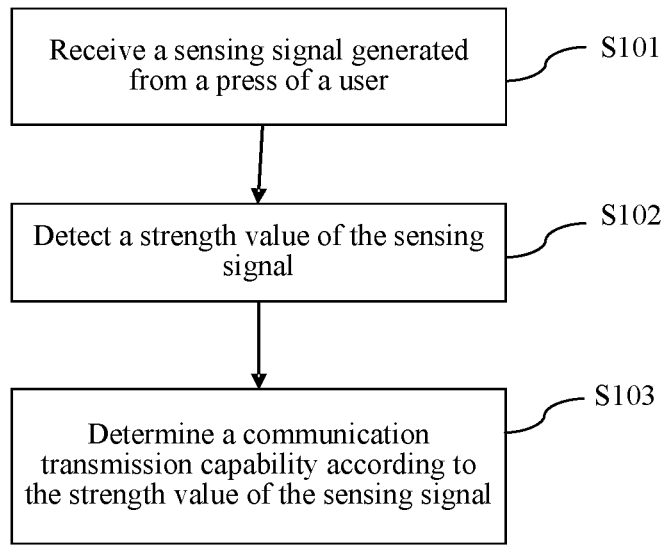
FIG. 2 is a flowchart of an embodiment of a force touch-based communication enhancement method according to the present invention.

FIG. 2 shows a force touch-based communication enhancement method according to an embodiment of the present invention. This embodiment includes the following operations.

Operation S101: A mobile terminal obtains a sensing signal generated from a press of a user.

The mobile terminal receives the press of the user by using an installed sensor. The sensor may be located at any position of the mobile terminal, for example, a side face, a front face, or a rear face of the mobile terminal. For example, the mobile terminal may receive the press of the user in a signal strength display area.

Operation S102: The mobile terminal detects a strength value of the sensing signal.

After the mobile terminal receives the press of the user by using the built-in sensor, a processor detects a magnitude of pressing force. When the magnitude of the pressing force exceeds a specific threshold, the processor may start processing of enhancing communication transmission according to the magnitude of the force by adjusting a quantity of uplink transmit antennas.

Operation S103: The mobile terminal determines an uplink communication transmission capability according to the strength value of the sensing signal.

Embodiment 1

To implement wireless transmission, an antenna is configured on a mobile terminal. Quantities of antennas configured on different mobile terminals may be different. Generally, mobile terminals have configurations of different quantities of antennas, such as one antenna, two antennas, four antennas, eight antennas, 16 antennas, 32 antennas, 64 antennas, 128 antennas, or 256 antennas. A mobile terminal detects a magnitude P of pressing force (that is, a strength value P of a sensing signal), and maps the magnitude P of the pressing force to a quantity of antennas to be enabled.

If 4 antennas are configured on the mobile terminal, the magnitude P of the force may be mapped to the quantity of antennas to be enabled in the following manner:

| Magnitude P of force | $P_1$ | $P_2$ | $P_3$ |
|---|---|---|---|
| Quantity of antennas to be enabled | 1 | 2 | 4 |

If 256 antennas are configured on the mobile terminal, the magnitude P of the force may be mapped to the quantity of antennas to be enabled in the following manner:

| Magnitude P of force | $P_1$ | $P_2$ | $P_3$ | $P_4$ |
|---|---|---|---|---|
| Quantity of antennas to be enabled | 4 | 16 | 64 | 256 |

In one embodiment, a mapping manner is not limited to the foregoing two manners. The magnitude of the force may be flexibly mapped, according to a quantity of actually configured antennas of the mobile terminal, to the quantity of antennas to be enabled.

Then, the mobile terminal enables the corresponding quantity of antennas.

The mobile terminal enables the corresponding quantity of antennas according to the quantity of antennas to which the magnitude of the force is mapped in operation S103, to implement multi-antenna transmission. In addition, the mobile terminal may perform transmission according to the quantity of enabled antennas in different MIMO (multiple input multiple output) modes, for example, switching from a space diversity mode to a spatial multiplexing mode; or perform transmission by using different quantities of streams.

Embodiment 2

Figure 3:
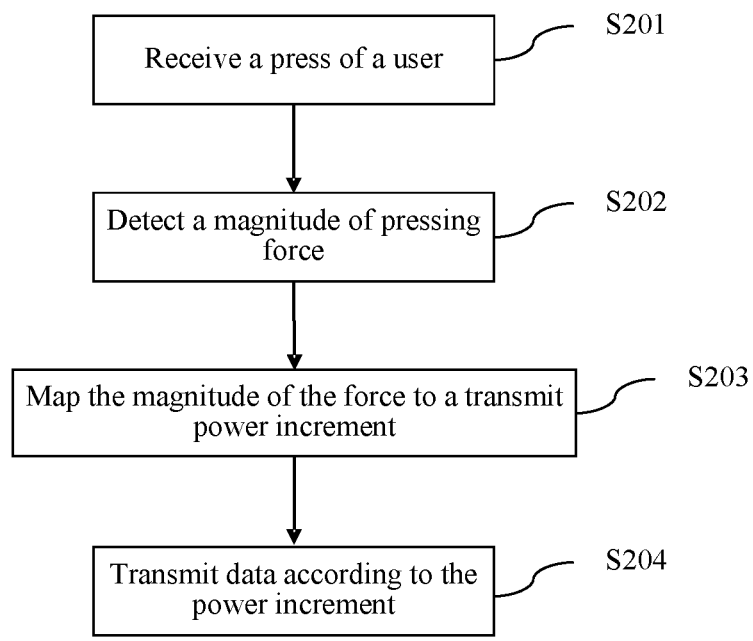
FIG. 3 is a flowchart of Embodiment 2 of a force touch-based communication enhancement method according to the present invention.

FIG. 3 shows a force touch-based communication enhancement method according to Embodiment 2 of the present invention. This embodiment includes the following operations.

Operation S201: A mobile terminal receives a press of a user, and obtains a sensing signal generated from the press of the user.

The mobile terminal receives the press of the user by using an installed sensor module. The sensor may be located at any position of the mobile terminal, for example, a side face, a front face, or a rear face of the mobile terminal.

Operation S202: Detect a magnitude of pressing force, to obtain a strength value of the sensing signal.

The mobile terminal receives the press of the user, and detects the magnitude of the pressing force; and when the magnitude of the pressing force exceeds a specific threshold, enhances communication transmission according to the magnitude of the force by adjusting an uplink transmit power.

Operation S203: Map the magnitude of the force (that is, the strength value P of the sensing signal) to a transmit power increment.

The mobile terminal maps the magnitude P of the force to a transmit power increment $\Delta$ according to the detected magnitude of the force. As shown in the following table, when the magnitude of the force is $P_1$, a corresponding transmit power increment is $\Delta_1$; when the magnitude of the force is $P_2$, a corresponding transmit power increment is $\Delta_2$; or when the magnitude of the force is $P_3$, a corresponding transmit power increment is $\Delta_3$. The foregoing power increments $\Delta_1$, $\Delta_2$, and $\Delta_3$ may be set according to an actual situation, for example, $\Delta 1=1$ dB, $\Delta 2=2$ dB, and $\Delta 3=3$ dB, or may be set to other increment values.

| Magnitude P of force | $P_1$ | $P_2$ | $P_3$ |
|---|---|---|---|
| Transmit power increment $\Delta$ | $\Delta_1$ | $\Delta_2$ | $\Delta_3$ |

Operation S204: Transmit data according to the power increment.

The mobile terminal calculates a transmit power according to the transmit power increment $\Delta$ in operation S203. Assuming that a current transmit power of the mobile terminal is $W_0$, a maximum transmit power of the mobile terminal is $W_{max}$, and the transmit power increment in S203 is $\Delta$, if $W=W_0+\Delta$ is less than the maximum transmit power $W_{max}$, the mobile terminal transmits the data at the transmit power W; otherwise, the mobile terminal transmits the data at the maximum transmit power $W_{max}$.

Embodiment 3

Figure 4:
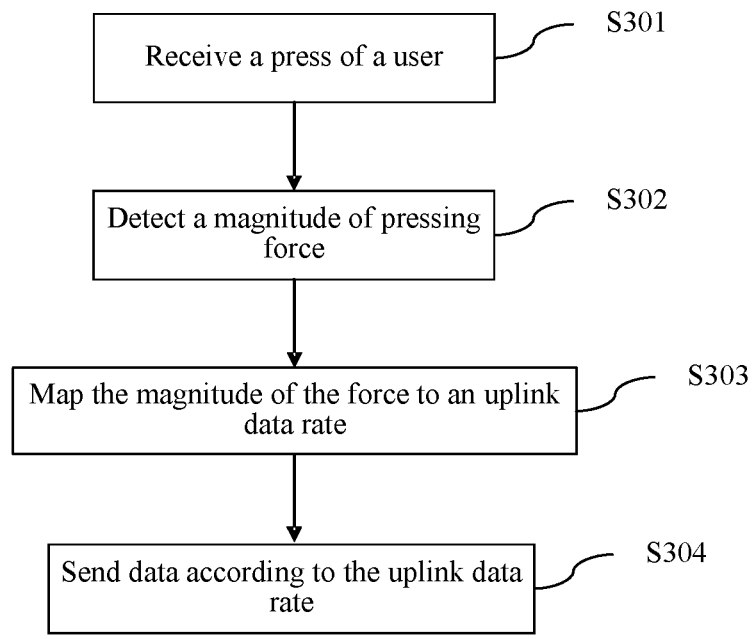
FIG. 4 is a flowchart of Embodiment 3 of a force touch-based communication enhancement method according to the present invention.

FIG. 4 shows a force touch-based communication enhancement method according to Embodiment 3 of the present invention. This embodiment includes the following operations.

Operation S301: A mobile terminal receives a press of a user, and obtains a sensing signal generated from the press of the user.

The mobile terminal receives the press of the user by using an installed sensor module. The sensor may be located at any position of the mobile terminal, for example, a side face, a front face, or a rear face of the mobile terminal.

Operation S302: Detect a magnitude of pressing force, to obtain a strength value of the sensing signal.

The mobile terminal receives the press of the user, and detects the magnitude of the pressing force; and when the magnitude of the pressing force exceeds a specific threshold, enhances communication transmission according to the magnitude of the force by adjusting an uplink data rate.

Operation S303: Map the magnitude of the force (that is, the strength value P of the sensing signal) to an uplink data rate.

The mobile terminal maps the magnitude P of the force to the uplink data rate according to the detected magnitude of the force. The magnitude P of the force is mapped to the uplink data rate in the following several implementation manners:

Implementation method 1: The magnitude P of the force is mapped to an uplink data rate increment. As shown in the following table, when the magnitude of the force is $P_1$, a corresponding uplink data rate increment is $\Delta_1$; when the magnitude of the force is $P_2$, a corresponding uplink data rate increment is $\Delta_2$; or when the magnitude of the force is $P_3$, a corresponding uplink data rate increment is $\Delta_3$. The foregoing power increments $\Delta_1$, $\Delta_2$, and $\Delta_3$ may be set according to an actual situation, for example, $\Delta_1=10$ Mbps, $\Delta_2=20$ Mbps, and $\Delta_3=50$ Mbps, or may be set to other increment values.

| Magnitude P of force | $P_1$ | $P_2$ | $P_3$ |
|---|---|---|---|
| Uplink data rate increment $\Delta$ | $\Delta_1$ | $\Delta_2$ | $\Delta_3$ |

Implementation method 2: The magnitude of the force is directly mapped to an uplink data rate. As shown in the following table, when the magnitude of the force is $P_1$, a corresponding uplink data rate is 50 Mbps; when the magnitude of the force is $P_2$, a corresponding uplink data rate is 100 Mbps; or when the magnitude of the force is $P_3$, a corresponding uplink data rate is 500 Mbps.

| Magnitude P of force | $P_1$ | $P_2$ | $P_3$ |
|---|---|---|---|
| Uplink data rate | 50 Mbps | 100 Mbps | 500 Mbps |

Operation S304: Send data according to the uplink data rate.

The mobile terminal selects, according to a mapping status of the magnitude of the force in S303, a proper uplink data rate for sending the data. If the magnitude of the force is mapped to an uplink data rate increment in S303, the mobile terminal selects a sum of a current uplink data rate and the uplink data rate increment to which the magnitude of the force is mapped as the uplink data rate for sending data. If the magnitude of the force is mapped to an uplink data rate in S303, the mobile terminal sends the uplink data according to the uplink data rate to which the magnitude of the force is mapped.

Embodiment 4

Figure 5:
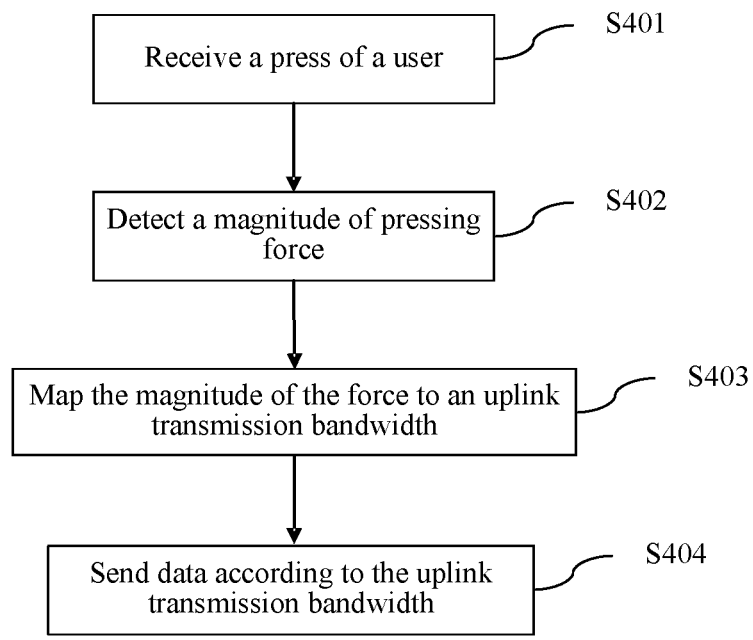
FIG. 5 is a flowchart of Embodiment 4 of a force touch-based communication enhancement method according to the present invention.

FIG. 5 shows a force touch-based communication enhancement method according to Embodiment 4 of the present invention. This embodiment includes the following operations.

Operation S401: A mobile terminal receives a press of a user, and obtains a sensing signal generated from the press of the user.

The mobile terminal receives the press of the user by using an installed sensor module. The sensor may be located at any position of the mobile terminal, for example, a side face, a front face, or a rear face of the mobile terminal.

Operation S402: Detect a magnitude of pressing force, to obtain a strength value of the sensing signal.

The mobile terminal receives the press of the user, and detects the magnitude of the pressing force; and when the magnitude of the pressing force exceeds a specific threshold, enhances communication transmission according to the magnitude of the force by adjusting an uplink transmission bandwidth.

Operation S403: Map the magnitude of the force (that is, the strength value P of the sensing signal) to an uplink transmission bandwidth.

The mobile terminal maps the magnitude P of the force to the uplink transmission bandwidth according to the detected magnitude of the force. The magnitude P of the force is mapped to the uplink transmission bandwidth in the following several implementation manners:

Implementation method 1: The magnitude P of the force is mapped to an uplink transmission bandwidth increment. As shown in the following table, when the magnitude of the force is $P_1$, a corresponding uplink transmission bandwidth increment is $\Delta_1$; when the magnitude of the force is $P_2$, a corresponding uplink transmission bandwidth increment is $\Delta_2$; or when the magnitude of the force is P3, a corresponding uplink data rate increment is $\Delta_3$. The foregoing transmission bandwidths $\Delta_1$, $\Delta_2$, and $\Delta_3$ may be set according to an actual situation, for example, $\Delta_1=20$ RBs (RB: Resource Block, resource block), $\Delta_2=40$ RBs (RB: Resource Block, resource block), and $\Delta_3=80$ RBs (RB: Resource Block, resource block), or may be set to other increment values.

| Magnitude P of force | $P_1$ | $P_2$ | $P_3$ |
|---|---|---|---|
| Uplink transmission bandwidth increment Δ | $\Delta_1$ | $\Delta_2$ | $\Delta_3$ |

Implementation method 2: The magnitude of the force is directly mapped to an uplink transmission bandwidth. As shown in the following table, when the magnitude of the force is $P_1$, a corresponding uplink transmission bandwidth is 50 RBs (resource block); when the magnitude of the force is $P_2$, a corresponding uplink transmission bandwidth is 100 RBs; or when the magnitude of the force is $P_3$, a corresponding uplink transmission bandwidth is 150 RBs.

| Magnitude P of force | $P_1$ | $P_2$ | $P_3$ |
|---|---|---|---|
| Uplink transmission bandwidth | 50 RBs | 100 RBs | 150 RBs |

Operation S404: Send data according to the uplink transmission bandwidth.

The mobile terminal selects, according to a mapping status of the magnitude of the force in operation S403, a proper uplink transmission bandwidth for sending the data. If the magnitude of the force is mapped to an uplink transmission bandwidth increment in operation S403, the mobile terminal selects a sum of a current uplink transmission bandwidth and the uplink transmission bandwidth increment to which the magnitude of the force is mapped as the uplink transmission bandwidth for sending data. If the magnitude of the force is mapped to an uplink transmission bandwidth in operation S403, the mobile terminal sends the uplink data according to the uplink transmission bandwidth to which the magnitude of the force is mapped.

Embodiment 5

Figure 6:
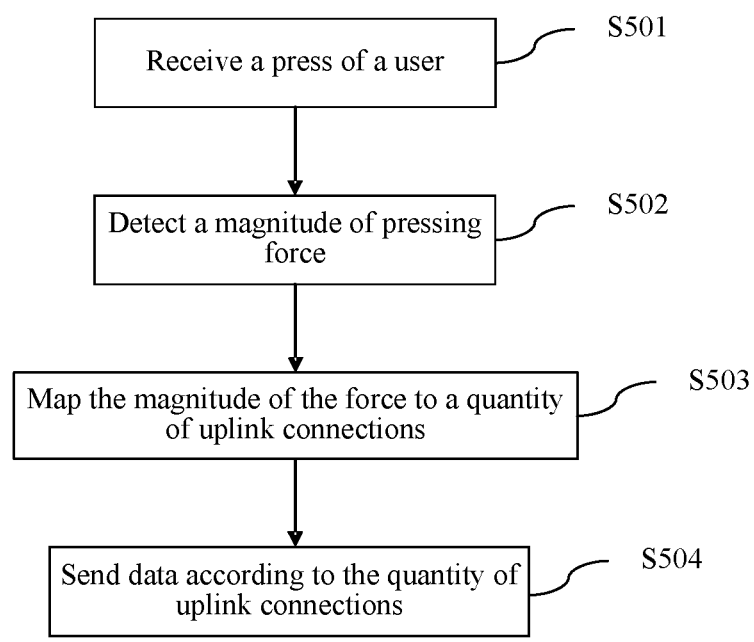
FIG. 6 is a flowchart of Embodiment 5 of a force touch-based communication enhancement method according to the present invention.

FIG. 6 shows a force touch-based communication enhancement method according to Embodiment 5 of the present invention. This embodiment includes the following operations.

Operation S501: A mobile terminal receives a press of a user, and obtains a sensing signal generated from the press of the user.

The mobile terminal receives the press of the user by using an installed sensor module. The sensor may be located at any position of the mobile terminal, for example, a side face, a front face, or a rear face of the mobile terminal.

Operation S502: Detect a magnitude of pressing force, to obtain a strength value of the sensing signal.

The mobile terminal receives the press of the user, and detects the magnitude of the pressing force; and when the magnitude of the pressing force exceeds a specific threshold, enhances communication transmission according to the magnitude of the force by adjusting a quantity of uplink connections.

Operation S503: Map the magnitude of the force (that is, the strength value P of the sensing signal) to a quantity of uplink connections.

The mobile terminal maps the magnitude P of the force to the quantity of uplink connections according to the detected magnitude of the force. As shown in the following table, when the magnitude of the force is P1, a corresponding quantity of uplink connections is 2; when the magnitude of the force is $P_2$, a corresponding quantity of uplink connections is 3; or when the magnitude of the force is $P_3$, a corresponding quantity of uplink connections is 4. The connection is an uplink connection from the mobile terminal to a base station. The base station may be a macro cellular base station or a micro cellular base station, or may be a WiFi AP (AP: Access Point, access point). The base station may work in a high frequency band or work in a low frequency band.

| Magnitude P of force | $P_1$ | $P_2$ | $P_3$ |
|---|---|---|---|
| Quantity of uplink connections | 2 | 3 | 4 |

Operation S504: Send data according to the quantity of uplink connections.

The mobile terminal establishes a connection to the corresponding quantity of base stations according to the quantity of uplink connections to which the magnitude of the force is mapped in operation S503. The connection is an uplink connection from the mobile terminal to a base station. The base station may be a macro cellular base station or a micro cellular base station, or may be a WiFi AP (AP: Access Point, access point). The base station may work in a high frequency band or work in a low frequency band. The mobile terminal sends the data by means of the connection.

Embodiment 6

Figure 7:
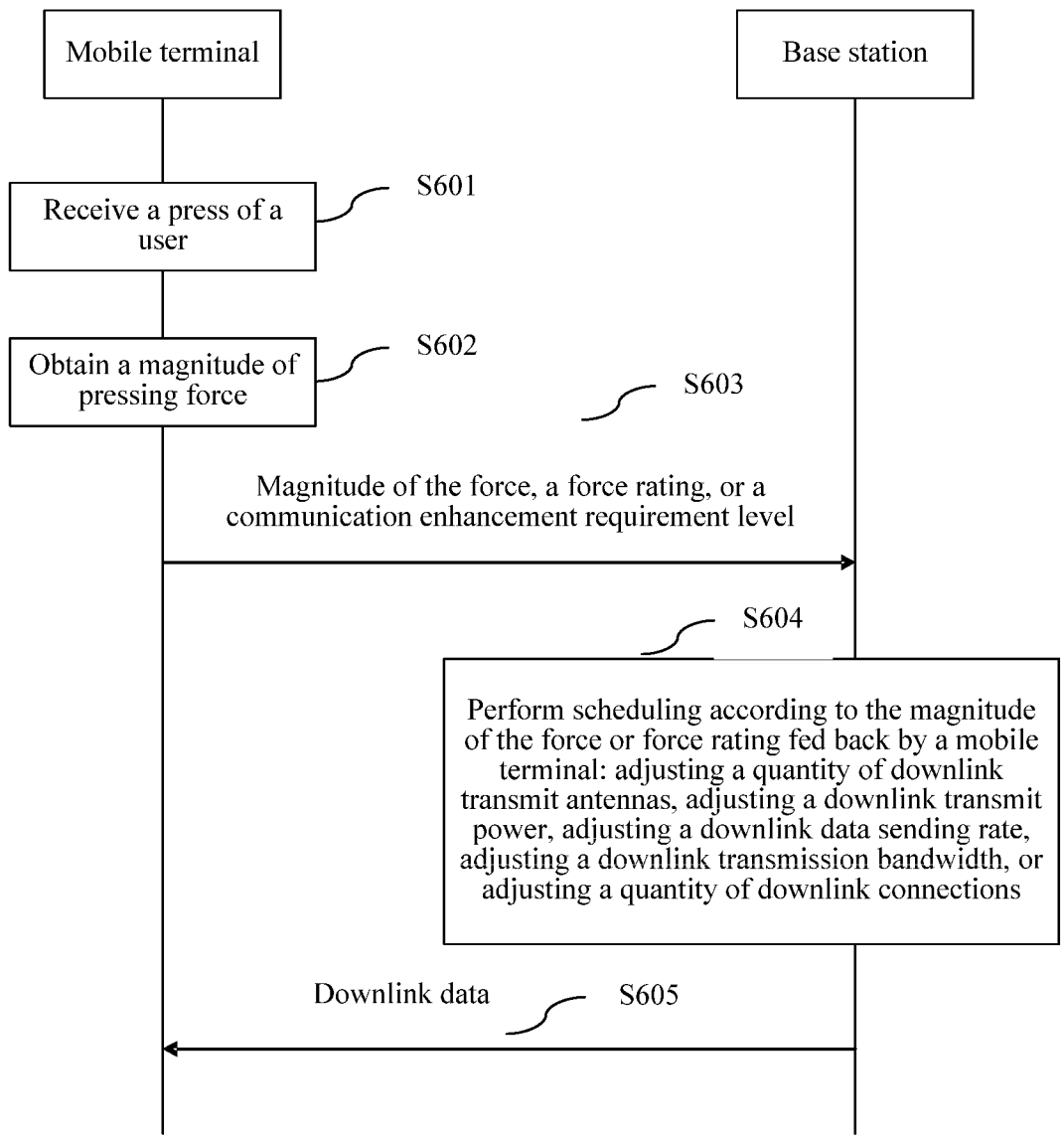
FIG. 7 is a flowchart of Embodiment 6 of a force touch-based communication enhancement method according to the present invention.

FIG. 7 shows a force touch-based communication enhancement method according to Embodiment 6 of the present invention. This embodiment includes the following operations.

Operation S601: A mobile terminal receives a press of a user, and obtains a sensing signal generated from the press of the user.

The mobile terminal receives the press of the user by using an installed sensor module. The sensor may be located at any position of the mobile terminal, for example, a side face, a front face, or a rear face of the mobile terminal.

Operation S602: Detect a magnitude of pressing force, to obtain a strength value of the sensing signal.

The mobile terminal receives the press of the user, and detects the magnitude P of the pressing force.

Operation S603: Feed back the magnitude of the force or a force rating (that is, the strength value P of the sensing signal) or a communication enhancement requirement level.

The mobile terminal feeds the magnitude P of the force or the force rating back to a base station. Generally, magnitudes of force are classified into several ratings according to values of the magnitudes of force. Different ratings represent different force ranges. As shown in the following table, when the force is greater than or equal to $P_1$ and less than $P_2$, a force rating is referred to as rating 1; when the force is greater than or equal to $P_2$ and less than $P_3$, a force rating is referred to as rating 2; or when the force is greater than or equal to $P_3$, a force rating is referred to as rating 3. In actual usage, both a force rating and a force range corresponding to the force rating may be defined according to different mobile terminals.

| Magnitude of force | $P_1$ | $P_2$ | $P_3$ |
|---|---|---|---|
| Force rating | 1 | 2 | 3 |

Operation S604: A base station receives the magnitude of the force, the force rating, or the communication enhancement requirement level (for example, a quantity of downlink transmit antennas, a downlink transmit power level, a downlink data sending rate level, a downlink bandwidth level, or a quantity of downlink connections) fed back by the mobile terminal; and performs scheduling according to the received magnitude of the force or force rating, to enhance downlink communication transmission:

adjusting the quantity of downlink transmit antennas based on the magnitude of the force, the force rating, or the communication enhancement requirement level; or adjusting a downlink transmit power based on the magnitude of the force, the force rating, or the communication enhancement requirement level; or adjusting a downlink data sending rate based on the magnitude of the force, the force rating, or the communication enhancement requirement level; or adjusting a downlink transmission bandwidth based on the magnitude of the force, the force rating, or the communication enhancement requirement level; or adjusting the quantity of downlink connections based on the magnitude of the force, the force rating, or the communication enhancement requirement level.

Operation S605: Send downlink data to the mobile terminal according to a result of the scheduling in operation S604 and based on the quantity of downlink transmit antennas, the downlink transmit power, the downlink data sending rate, the downlink transmission bandwidth, or the quantity of downlink connections determined in S604.

Embodiment 7

Figure 8:
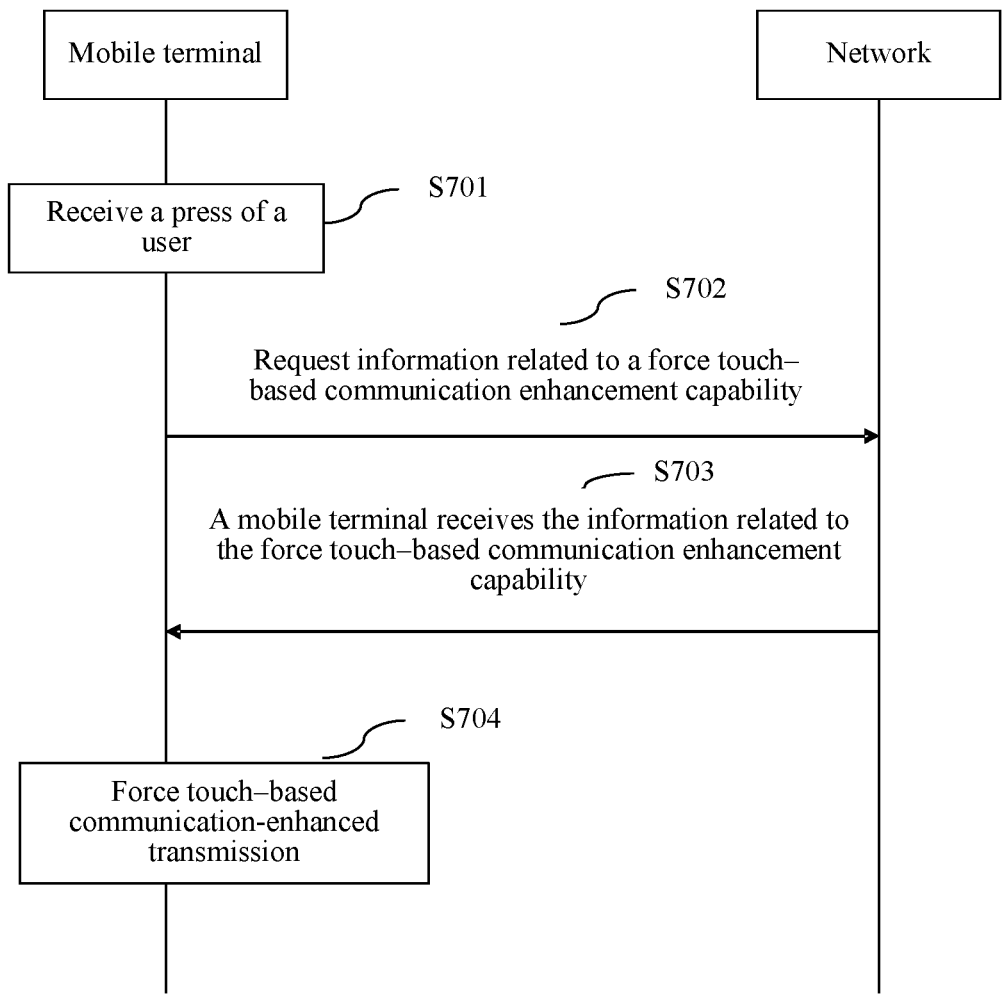
FIG. 8 is a flowchart of Embodiment 7 of a force touch-based communication enhancement method according to the present invention.

FIG. 8 shows a force touch-based communication enhancement method according to Embodiment 7 of the present invention. This embodiment includes the following operations.

Operation S701: A mobile terminal receives a press of a user, and obtains a sensing signal generated from the press of the user.

The mobile terminal receives the press of the user by using an installed sensor module. The sensor may be located at any position of the mobile terminal, for example, a side face, a front face, or a rear face of the mobile terminal.

Operation S702: The mobile terminal requests information related to a force touch-based communication enhancement capability of the mobile terminal.

The mobile terminal may query a network side for the information related to the force touch-based communication enhancement capability of the mobile terminal. An operator formulates a specific charging policy according to a requirement of a mobile user. For example, if a user wants the mobile terminal to have the force touch-based communication enhancement capability, the user needs to pay some fees each month, for example, 5 CNY or 10 CNY each month. On the other hand, the operator may also provide differentiated services according to differentiated requirements of users, and divide force touch-based communication enhancement capabilities for users into different levels. Users subscribing to different levels of communication enhancement capabilities may enjoy the communication enhancement capabilities of the corresponding levels on mobile terminals by paying monthly fees required by the corresponding levels. For example, the operator may divide force touch-based communication enhancement capabilities of mobile terminals into three levels. Correspondingly, fees that users subscribing to these three levels need to pay each month are 5 CNY, 15 CNY, 30 CNY, and the like. If a user chooses a first level and pays 5 CNY each month, when the user uses the force touch-based communication enhancement capability, an uplink rate for the user may increase to a maximum of 100 Mbps. If a user chooses a second level and pays 15 CNY each month, when the user uses the force touch-based communication enhancement capability, an uplink rate for the user may increase to a maximum of 300 Mbps. If a user chooses a third level and pays 30 CNY each month, when the user uses the force touch-based communication enhancement capability, an uplink rate for the user may increase to a maximum of 1 Gbps. During actual operation, the operator may formulate a corresponding force touch-based communication capability level, a corresponding charging policy, and the like according to an actual situation.

Operation S703: The mobile terminal receives the information that is related to the force touch-based communication enhancement capability of the mobile terminal and that is fed back by a network side.

The related information includes at least one of the following: whether the mobile terminal has the force touch-based communication enhancement capability, a level of the force touch-based communication enhancement capability of the mobile terminal, or the like.

Operation S704: The mobile terminal performs communication-enhanced transmission according to the information related to the force touch-based communication enhancement capability of the mobile terminal.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) or a processor to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A force touch-based communication enhancement method, the method comprising:
   obtaining, by a mobile terminal, a sensing signal generated from a press of a user;
   obtaining, by the mobile terminal, a strength value of the sensing signal generated from the press of the user; and
   determining, by the mobile terminal, a communication transmission capability between the mobile terminal and a base station according to the strength value of the sensing signal, including:
      determining, by the mobile terminal, an uplink data rate according to the strength value of the sensing signal, and
      sending uplink data according to the uplink data rate.

2. The method according to claim 1, wherein the determining the communication transmission capability between the mobile terminal and the base station according to the strength value of the sensing signal comprises:
   determining, by the mobile terminal according to the strength value of the sensing signal, a quantity of antennas to be enabled,
   enabling the corresponding quantity of antennas, and
   performing uplink data transmission by using the enabled antennas.

3. The method according to claim 1, wherein the determining the communication transmission capability between the mobile terminal and the base station according to the strength value of the sensing signal further comprises:
   determining, by the mobile terminal, a transmit power increment according to the strength value of the sensing signal, and
   sending uplink data according to the transmit power increment.

4. The method according to claim 3, wherein the method further comprises:
   calculating, by the mobile terminal, a sum of the transmit power increment and a current transmit power; and
   when the sum of the transmit power increment and the current transmit power is less than a maximum transmit power, sending, by the mobile terminal, data at a power equal to the sum of the transmit power increment and the current transmit power; otherwise, transmitting data at the maximum transmit power.

5. The method according to claim 1, wherein the determining the communication transmission capability between the mobile terminal and the base station according to the strength value of the sensing signal further comprises:
   determining, by the mobile terminal, an uplink data rate increment according to the strength value of the sensing signal, and
   sending uplink data according to the uplink data rate increment or a sum of the uplink data rate increment and a current uplink data rate.

6. The method according to claim 1, wherein the determining the communication transmission capability between the mobile terminal and the base station according to the strength value of the sensing signal further comprises:
   determining, by the mobile terminal, an uplink transmission bandwidth according to the strength value of the sensing signal, and
   sending uplink data according to the uplink transmission bandwidth.

7. The method according to claim 1 wherein the determining the communication transmission capability between the mobile terminal and the base station according to the strength value of the sensing signal further comprises:
   determining, by the mobile terminal, an uplink transmission bandwidth increment according to the strength value of the sensing signal, and
   sending uplink data according to the uplink transmission bandwidth increment or a sum of the uplink transmission bandwidth increment and a current uplink transmission bandwidth.

8. The method according to claim 1, wherein the determining the communication transmission capability between the mobile terminal and the base station according to the strength value of the sensing signal further comprises:
   determining, by the mobile terminal, a quantity of uplink connections according to the strength value of the sensing signal, and
   sending uplink data according to the quantity of uplink connections.

9. The method according to claim 1, wherein the determining the communication transmission capability between the mobile terminal and the base station according to the strength value of the sensing signal further comprises:
   sending, by the mobile terminal, the strength value of the sensing signal to the base station or a network device, wherein the strength value of the sensing signal is used by the base station or the network device to perform wireless scheduling to enhance a downlink communication transmission capability; and
   performing, by the mobile terminal, communication transmission using an uplink communication transmission capability obtained after scheduling performed by the base station or the network device.

10. The method according to claim 1, wherein the determining the communication transmission capability between the mobile terminal and the base station according to the strength value of the sensing signal further comprises:
    generating, by the mobile terminal, a communication enhancement requirement signal according to the strength value of the sensing signal;
    sending, by the mobile terminal, the communication enhancement requirement signal to the base station or a network device, wherein the communication enhancement requirement signal is used by the base station or the network device to perform wireless scheduling to enhance downlink communication transmission; and performing, by the mobile terminal, communication transmission using the uplink communication transmission capability obtained after scheduling performed by the base station or the network device.

11. A mobile terminal, comprising:
an antenna;
a transceiver;
a sensor configured to obtain a sensing signal generated from a press of a user; and
a processor configured to detect a strength value of the sensing signal generated from the press of the user and determine a communication transmission capability between the mobile terminal and a base station according to the strength value of the sensing signal, including:
  determining, by the mobile terminal, an uplink data rate according to the strength value of the sensing signal, and
  sending uplink data according to the uplink data rate.

12. The mobile terminal according to claim 11, wherein:
the processor is configured to: detect the strength value of the sensing signal; determine, according to the strength value of the sensing signal, a quantity of antennas to be enabled; and enable the corresponding quantity of antennas.

13. The mobile terminal according to claim 11, wherein:
the processor is further configured to determine a transmit power of the transceiver or the antenna according to the strength value of the sensing signal.

14. The mobile terminal according to claim 11, wherein:
the transceiver is further configured to send the strength value of the sensing signal to the base station or a network device using the antenna, wherein the strength value of the sensing signal is used by the base station or the network device to perform wireless scheduling to enhance a downlink communication transmission capability; and
the transceiver is further configured to perform communication transmission using the uplink communication transmission capability obtained after the wireless scheduling performed by the base station or the network device.

15. The mobile terminal according to claim 11, wherein:
the processor is further configured to generate a communication enhancement requirement signal according to the strength value of the sensing signal, wherein the communication enhancement requirement signal is used by the base station or the network device to perform wireless scheduling to enhance downlink communication transmission; and
the transceiver is further configured to send the communication enhancement requirement signal to the base station or the network device using the antenna.

16. The mobile terminal according to claim 11, wherein:
the processor is further configured to determine a quantity of uplink connections according to the strength value of the sensing signal, and send uplink data according to the quantity of uplink connections.

17. A non-transitory computer readable medium having instructions stored therein, which when executed by a processor, cause the processor to perform operations of a mobile terminal, the operations comprising:
  obtaining a sensing signal generated from a press of a user;
  obtaining a strength value of the sensing signal generated from the press of the user; and
  determining a communication transmission capability between the mobile terminal and a base station according to the strength value of the sensing signal, including:
    determining an uplink data rate according to the strength value of the sensing signal, and
    sending uplink data according to the uplink data rate.

18. The computer readable medium according to claim 17, wherein the determining the communication transmission capability between the mobile terminal and the base station according to the strength value of the sensing signal comprises:
  determining, according to the strength value of the sensing signal, a quantity of antennas to be enabled;
  enabling the corresponding quantity of antennas; and
  performing uplink data transmission by using the enabled antennas.

* * * * *